P. P. PARKER.
Sack-Scales.

No. 157,345. Patented Dec. 1, 1874.

WITNESSES:
Francis McArdle
A. F. Terry

INVENTOR:
P. P. Parker
BY Munn & Co.
ATTORNEYS.

UNITED STATES PATENT OFFICE.

PASCAL P. PARKER, OF PARKERSBURG, IOWA, ASSIGNOR TO HIMSELF AND MILTON I. POWERS, OF SAME PLACE.

IMPROVEMENT IN SACK-SCALES.

Specification forming part of Letters Patent No. 157,345, dated December 1, 1874; application filed October 10, 1874.

*To all whom it may concern:*

Figure 1:
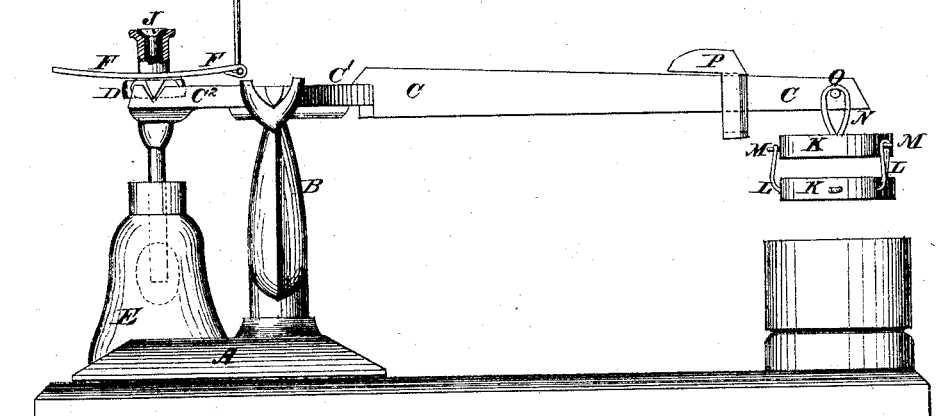
Figure 2:
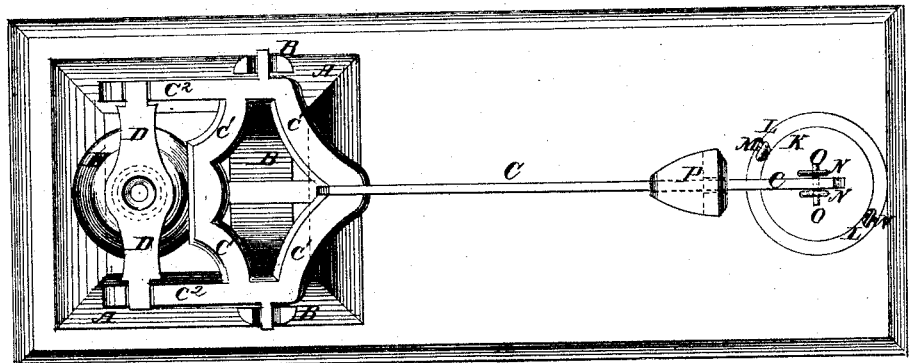
Figure 3:
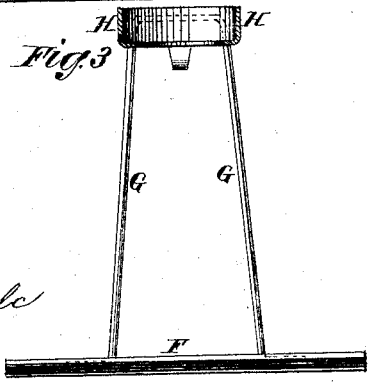

Be it known that I, PASCAL P. PARKER, of Parkersburg, in the county of Butler and State of Iowa, have invented a new and useful Improvement in Weighing-Scale, of which the following is a specification:

Figure 1 is a side view of my improved scale. Fig. 2 is a top view of the same, the scale-pan and its attachments being removed. Fig. 3 is a detail view of the scale-pan and its attachment partly in section, to show the construction.

Similar letters of reference indicate corresponding parts.

The invention will first be fully described, and then pointed out in the claim.

A represents the base or bed plate of the scale, upon which is formed, or to which is attached, a forked standard, B, the ends of the arms or branches of which are notched to receive the knife-edge ends of the cross-bar or frame $c^1$ of the beam C, and form the pivot of the said beam. Upon the end parts of the cross-bar or frame $c^1$ are formed two rearwardly-projecting arms, $c^2$, having notches formed in the upper side of their outer ends to receive the knife-edge ends of the scale-pan bar or holder D. To the bar or holder D is attached a downwardly-projecting weighted arm, $d'$, to keep the scale-pan level when being used, and which works in and is protected by a hollow pedestal, E, attached to or formed upon the base A. To the inner edge of the scale-pan F are attached the ends of two standards, G, or of a U-standard, to the upper ends or part of which is attached an oval band, H, having an inwardly-projecting flange formed upon its lower edge, and which is provided with an open spring-ring, I, for supporting a bag, and holding its mouth open while being filled, and having exactly the required amount of any substance put into it. When thus used, the scale-pan F should be secured to the scale-pan holder D by a screw, J, to prevent it from being tipped by the bag. K is a series of weights, upon the opposite sides of each lower one of which are formed, or to them are attached, loops L, to receive pins M formed upon or attached to the opposite sides of each upper weight. To the upper weight K are attached two loops, N, to receive the ends of a pin, O, passing through the end of the beam C.

By this construction, when an amount of the substance being weighed, represented by the upper or first weight K, has been placed upon the scale-pan, the said first weight will be raised. As more of the substance is added, the next weight K will be raised, and so on until the desired amount has been reached. The weights K may be connected by loops and pins, as shown in Figs. 1 and 2, or by chains or other equivalent means.

P is a small sliding weight for weighing small or fractional quantities, or for balancing the scales.

Having thus described my invention, I claim as new and desire to secure by Letters Patent—

The combination, with an end-weighted lever C, fulcrumed in forked standard B, and having notched arms $C^2$, of the pan F, resting upon holder D, and having standards G supporting the bag-holder H I, as shown and described, for the purpose specified.

PASCAL P. PARKER.

Witnesses:
 N. T. JOHNSON,
 R. G. BUSHEY.